United States Patent [19]

Kim

[11] Patent Number: 5,592,772
[45] Date of Patent: Jan. 14, 1997

[54] FISHING ROD AND ITS METHOD OF MANUFACTURE

[75] Inventor: Young-Mook Kim, Pusan, Rep. of Korea

[73] Assignee: Wonder Co., Ltd., Pusan, Rep. of Korea

[21] Appl. No.: 366,042

[22] Filed: Dec. 29, 1994

[30] Foreign Application Priority Data

Apr. 23, 1994 [KR] Rep. of Korea .................. 1994-8746

[51] Int. Cl.$^6$ .................................................. A01K 87/00
[52] U.S. Cl. ................................................ 43/18.1; 43/18.5
[58] Field of Search ..................................... 43/18.1, 18.5

[56] References Cited

U.S. PATENT DOCUMENTS 3,421,247  1/1969  Hubbard ................................. 43/18.5
4,653,216  3/1987  Inoue ..................................... 43/18.5

FOREIGN PATENT DOCUMENTS 2619340  2/1989  France ................................... 43/18.1
2695295  3/1994  France ................................... 43/18.1
57-125630  8/1982  Japan .................................... 43/18.1

Primary Examiner—Joseph J. Hail, III
Assistant Examiner—I. H. Lin
Attorney, Agent, or Firm—Birch, Stewart, Kolasch & Birch, LLP

[57] ABSTRACT

A fishing rod includes an improved fishing rod including a tubular rod and a first plurality of multiple longitudinally extending, helical weavings intertwined with a second plurality of multiple longitudinally extending, helical weavings of a tow or yarn disposed on the tubular rod, the weavings defining a crossing interlocking pattern which provides high elasticity, excellent softness and super power control properties. The present invention is also directed to the method of manufacturing the fishing rod.

6 Claims, 1 Drawing Sheet

FISHING ROD AND ITS METHOD OF MANUFACTURE

BACKGROUND OF THE INVENTION

1. Field of the Invention

The present invention relates to a fishing rod and its method of manufacture and more particularly, to an improved fishing rod including a tubular rod and a first plurality of multiple longitudinally extending, helical weavings intertwined with a second plurality of multiple longitudinally extending, helical weavings of a tow or yarn disposed on the tubular rod, said weavings defining a crossing interlocking pattern which provides high elasticity, excellent softness and super power control properties. The present invention is also directed to the method of manufacturing the fishing rod.

2. Description of Related Art

Various types of fishing rods are well known in the art. Such conventional fishing rods are made by the following process. After a properly sized sheet of carbon prepreg such as a pre-impregnated material containing glass fibers is wound onto a steel fishing rod as a mold, a polyethylene or polypropylene tape is then wound on the rod mold. Thereafter, the rod mold is molded and processed and the steel rod mold is then separated therefrom and the tape is removed from the sheet to form the conventional fishing rod.

However, such conventional fishing rods suffer from a number of problems such as, for example, they tend to crack when the fishing rod is exposed to shock. Also, conventional fishing rods do not posses high elasticity, excellent softness and super power control, and also they are expensive to manufacture due to the complicated manufacturing steps which are required.

SUMMARY OF THE INVENTION

Accordingly, it is an object of the present invention to provide a fishing rod, which eliminates the above problems encountered with conventional fishing rods.

Another object of the present invention is to provide an improved fishing rod including a tubular rod and a first plurality of multiple longitudinally extending, helical weavings intertwined with a second plurality of multiple longitudinally extending, helical weavings of a tow or yarn disposed on the tubular rod, said weavings defining a crossing, interlocking pattern which possesses high elasticity, excellent softness and super power control properties.

A further object of the present invention is to provide a method of manufacturing a fishing rod which comprises the steps of longitudinally and helically weaving a plurality of weavings of tow or yarn onto a tubular rod, said weavings being initiated from different positions along the circumference of the tubular rod but proceeding in substantially the same direction longitudinally along the rod for intertwining and forming a crossing, interlocking pattern along the surface of the rod.

Still another object of the present invention is to provide a tubular fishing rod which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a fishing rod including a tubular rod which is provided with a plurality of multiple longitudinal, helical weavings which intertwine with each other and to a method of manufacturing such a fishing rod which possesses high elasticity, excellent softness and super power control properties.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
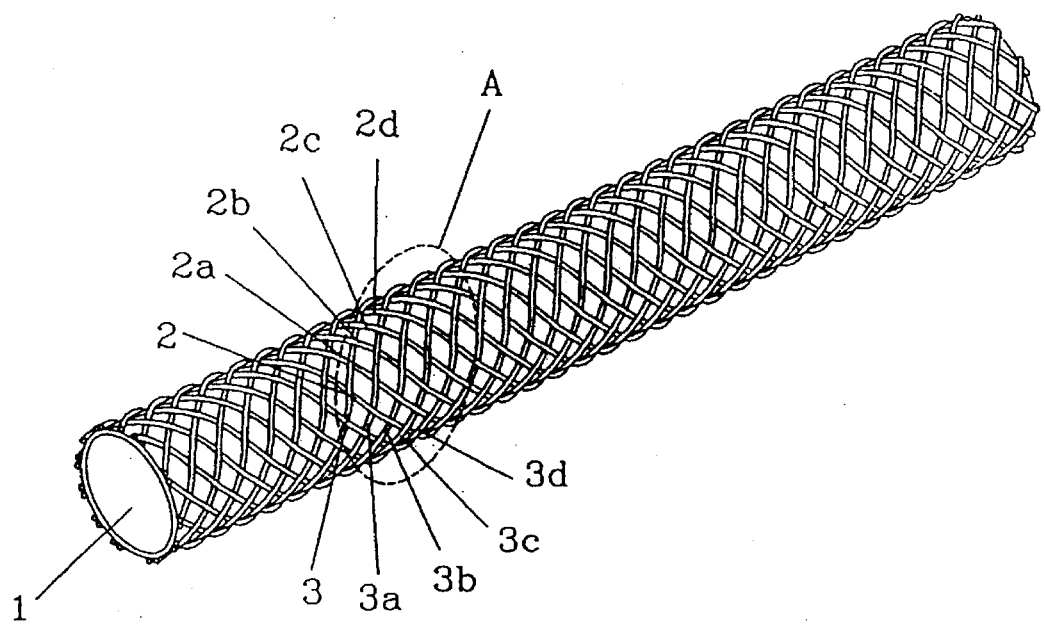
FIG. 1 is a perspective view of the fishing rod according to the present invention.
Figure 2:
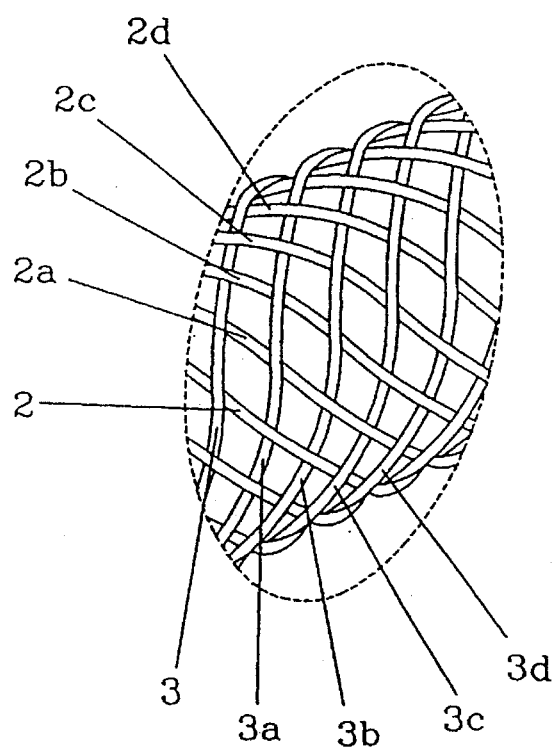
FIG. 2 is an enlarged perspective view of an A portion of FIG. 1 showing how the longitudinally extending, helical weavings disposed on the fishing rod cross and interlock with each other to produce the reinforced fishing rod of the present invention.

Referring now in detail to the drawings for the purpose of illustrating preferred embodiments of the present invention, the tubular fishing rod and its method of manufacture as shown in FIGS. 1 and 2 comprises a tubular rod 1, a first plurality of longitudinally extending tows or yarns and a second plurality of longitudinally extending tows or yarns helically intertwined with the first plurality of longitudinally extending tows and disposed on the surface of the tubular rod 1.

The tubular rod can be made of any well known natural or synthetic resinous (plastic) material, e.g., polyethylene, polypropylene, polyvinyl chloride, various types of polyesters, and the like. Also the tubular rod can be made of graphite, reinforced graphite, graphite-boron, and fiberglass.

The first plurality of longitudinally extending tows or yarns are identified in FIGS. 1 and 2 as elements 2, 2a, 2b, 2c, and 2d. The second plurality of longitudinally extending tows or yarns are identified in FIGS. 1 and 2 as elements 3, 3a, 3b, 3c, and 3d.

As shown in FIG. 2, each longitudinally extending tow or yarn 2, 2a, 2b, 2c, and 2d, etc. is helically intertwined with each longitudinally extending tow or yarn 3, 3a, 3b, 3c, and 3d, etc. in an over-under relationship and thus are intertwined in a crossing, interlocking pattern along the surface of the rod. The weaving process is repeated until the manufacture of the fishing rod is complete. The number of weaving can be varied to establish the desired properties in the fishing rod, such as strength, elasticity and the like. Advantageously, the weavings cross each other, two at a time in defining the interlocking and crossing pattern of the fibers.

The tows or yarns 2, 2a, 2b, 2c, 2d, 3, 3a, 3b, 3c, and 3d can be made of natural or synthetic resinous materials, carbon or glass fibers, or natural or synthetic resinous material containing carbon or glass fibers. The tow or yarn 2 can be in the form of a string, a braid or a bundle and advantageously, the resinous material can be an epoxy resin, a polyamide resin, or the like.

The method of manufacturing the tubular fishing rod according to the present invention can be described as follows. First of all, as shown in FIGS. 1 and 2, the first longitudinal tow or yarn 3 is helically intertwined with the first and second longitudinal tows or yarns 2 and 2a by passing over the tows or yarns 2 and 2a, and is further helically intertwined With the third and fourth longitudinal tows or yarns 2b and 2c by passing under the tows or yarns 2b and 2c. Thereafter, the tow or yarn 3 is helically intertwined with the longitudinal tows or yarns 2d, etc. and so on (not shown) by passing over tows or yarns 2d and so on.

The second longitudinal tow or yarn 3a is helically intertwined with the same manner as discussed above but when yarn 3a is passing over two yarns 2 and 2a, yarn 3 is passing under one yarn 2 and over adjacent yarn 2a. However, in the embodiment shown in FIGS. 1 and 2, all the yarns cross each other in an over-under relationship, two at a time. Although this arrangement has been found to be particularly effective in achieving the advantageous results of the present invention, it will be obvious that many other weaving an interlocking patterns can be utilized.

The number of tows or yarns 2, 2a, 3, 3a, etc. wound around the tubular rod can be varied depending on the properties desired in the fishing rod. Obviously, the distance the tows or yarns are disposed on the rod relates to each other affect the strength, elasticity, etc. of the rod. The closer the spacing, the stronger and more rigid the rod becomes.

The tows or yarns 2, 2a, 2b, 2c, 2d, 3, 3a, 3b, 3c, and 3d can be present in numbers of about 16 to 120 for providing high elasticity and super power control properties, preferably numbers of 40 to 100, more preferably numbers of 60 to 80. These number ranges indicate the number of tows or yarn disposed around the circumferential cross section of the fishing rod.

Accordingly, the fishing rod of the present invention as shown in FIG. 1 has high elasticity, excellent softness, and super power control so that the tubular fishing rod does not break, has a long lifetime and can be mass-produced. In order to produce a thick rod with increased hardness, the weaving process is continuously repeated.

In addition, the fishing rod according to the present invention is simple in structure, inexpensive to manufacture, durable in use and refined in appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fishing rod comprising:

a tubular rod having two ends;

a first plurality of weavings of tow or yarn helically and longitudinally wound around said tubular rod in a first direction; and a second plurality of weavings of tow or yarn helically and longitudinally wound around said tubular rod in a second direction, the first direction being opposite to the second direction, said first and second plurality of weavings being woven together such that they cross each other in the longitudinal direction in an over-under relationship to define a crosswise tubular weave construction which is both strong and flexible, the first and second plurality of weavings crossing one another at locations distributed around a circumference of the tubular rod, each weaving of the first plurality of weavings crosses the weavings of said second plurality of weavings, two at a time in said over-under relationship and each weaving of said second plurality of weavings crosses the weaving of said first plurality of weavings two at a time in said over-under relationship, the first plurality of weavings being wound at a first pitch and the plurality of second weavings being wound at a second pitch, the first pitch being one of a right-hand and left-hand pitch and the second pitch being the other of a right-hand and left-hand pitch, and weavings being made around the rod at only the first and second pitches except for the ends of the rods.

2. The fishing rod of claim 1, wherein said tow or yarn is made of natural or synthetic resinous materials, carbon or glass fibers, and natural or synthetic materials containing carbon or glass fibers.

3. The fishing rod of claim 2, wherein each tow or yarn is present in numbers of about 16 to 120 disposed around a circumferential cross section of the rod.

4. The fishing rod of claim 3, wherein each tow or yarn is present in numbers of about 60 to 80 disposed around the circumferential cross section of the rod.

5. The fishing rod of claim 3, wherein said tow or yarn is in the form of a string, a braid, or a bundle of fibers.

6. The fishing rod of claim 5, wherein the rod has two ends and wherein the rod has a generally uniform circumference between the two ends thereof.

* * * * *